United States Patent
Kwak et al.

(10) Patent No.: US 7,599,372 B2
(45) Date of Patent: Oct. 6, 2009

(54) APPARATUS FOR AND METHOD OF INTEGRATING SWITCHING AND TRANSFERRING OF SONET/SDH, PDH, AND ETHERNET SIGNALS

(75) Inventors: Sung Hoon Kwak, Daejeon (KR); Chang Gyu Lim, Chungcheongbuk-do (KR); Hyun Ha Hong, Daejeon (KR); Jong Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 703 days.

(21) Appl. No.: 10/884,039

(22) Filed: Jul. 1, 2004

(65) Prior Publication Data
US 2005/0141568 A1 Jun. 30, 2005

(30) Foreign Application Priority Data
Dec. 24, 2003 (KR) .................... 10-2003-0096194

(51) Int. Cl.
*H04L 12/56* (2006.01)
(52) U.S. Cl. .................. 370/395.1; 370/395.51; 709/251
(58) Field of Classification Search ......... 370/395, 370/395.1, 465, 401, 218, 395.51, 395.52; 709/251, 236
See application file for complete search history.

(56) References Cited

U.S. PATENT DOCUMENTS

| | | | |
|---|---|---|---|
| 5,251,206 A | 10/1993 | Calvignac et al. | |
| 6,496,519 B1 * | 12/2002 | Russell et al. | 370/465 |
| 6,633,584 B1 * | 10/2003 | Russell et al. | 370/466 |
| 6,798,779 B1 * | 9/2004 | Shimbashi et al. | 370/395.1 |
| 6,870,877 B2 * | 3/2005 | Notani | 375/221 |
| 7,031,324 B1 * | 4/2006 | Goody | 370/401 |
| 2001/0036187 A1 * | 11/2001 | Lometti et al. | 370/395 |
| 2003/0056017 A1 * | 3/2003 | Gonda | 709/251 |

FOREIGN PATENT DOCUMENTS

| | | |
|---|---|---|
| KR | P1999-1000001 | 1/1999 |
| KR | 20010088391 | 9/2001 |

* cited by examiner

*Primary Examiner*—William Trost, IV
*Assistant Examiner*—Emmanuel Maglo
(74) *Attorney, Agent, or Firm*—Blakely, Sokoloff, Taylor & Zafman LLP

(57) ABSTRACT

An apparatus for and a method of integrating switching and transferring of synchronous optical network/synchronous digital hierarchy (SONET/SDH), plesiochronous digital hierarchy (PDH), and Ethernet signals, which integrate and provide connection of synchronous digital (SONET/SDH) signals, plesiochronous digital (PDH) signals, and Ethernet signals, mutually change the synchronous digital (SONET/SDH) signals, the plesiochronous digital (PDH) signals, and the Ethernet signals, packet switching, synchronous timeslot switching, and channel configuration management and control functions in one system. Thus, packet switching capacity, timeslot switching capacity, and packet/timeslot bridging capacity can be enlarged and configured according to corresponding application. Also, a distinctive service compared to a service provided by a separate Ethernet device or a SONET/SDH network device can be provided through a packet/timeslot bridge. In addition, varied and reliable communication service at a moderate price can be provided to service users, and decreased investment and maintenance fee can be provided to carrier service providers.

9 Claims, 5 Drawing Sheets

APPARATUS FOR AND METHOD OF INTEGRATING SWITCHING AND TRANSFERRING OF SONET/SDH, PDH, AND ETHERNET SIGNALS

This application claims the priority of Korean Patent Application No. 2003-96194, filed on Dec. 24, 2003, in the Korean Intellectual Property Office, the disclosure of which is incorporated herein in its entirety by reference.

BACKGROUND OF THE INVENTION

1. Field of the Invention

The present invention relates to an apparatus for and a method of integrating switching and transferring of synchronous digital SONET/SDH signals, plesiochronous digital hierarchy PDH signals, and Ethernet signals.

2. Description of the Related Art

Generally, a synchronous optical network (SONET), a synchronous digital hierarchy (SDH) network, and a plesiochronous digital hierarchy (PDH) network use paths and bandwidths exclusively, thereby providing highly reliable and safe communications service. However, the exclusive use of the bandwidths decreases the usage efficiency of the bandwidths and the service usage price is expensive.

On the other hand, an Ethernet network that transfers Internet Protocols (IP) in frames does not use paths and bandwidths exclusively, and sharing of bandwidths is possible by using a statistical multiplexing function. Thus, the usage efficiency of the bandwidths is high and the service usage price is moderate. However, the communications reliability and safety is inferior to the SONET/SDH network because data loss through burst or runaway occurs.

Therefore, in order for a network service provider to provide a service with high reliability and safety at a moderate price in various bandwidths, both SONET/SDH network and Ethernet devices are needed. However, to operate and manage both SONET/SDH network and Ethernet devices requires high initial investment and system maintenance costs.

As a way to solve this problem, integrated systems and methods that can accept both SONET/SDH and Ethernet signals in a single platform, and switch and transfer the SONET/SDH and Ethernet signals are frequently used. These systems and methods can be classified into three categories according to a method of forming a switch fabric: forming a switching fabric with only a packet switch, forming a switching fabric with only a timeslot switch, and forming a switching fabric with a packet switch, a timeslot switch, and a signal conversion block between the packet switch and the timeslot switch.

The first method is appropriate for an application with high switching traffic among packet signals, but it has a very high difficulty in implementing a switching function for synchronous digital signals. The second method is appropriate for an application with high switching amount among synchronous digital signals, but the cost of a packet exchange service increases a lot compared to the first method. The third method can form a system accordingly to a switching amount among packet signals and synchronous digital signals, and can provide a conventional packet exchange service and a synchronous timeslot exchange service with the same quality and price.

Another method besides the previously mentioned ones is to use an asynchronous transfer mode (ATM) switch and to switch synchronous digital signals and packet signals after they are transformed into ATM cells. This method has an advantage of providing a reliable virtual connection service by the ATM. However, to apply this method, an additional connection setting is required even for sending the packet signals, which makes it difficult to control an application. Also, it is difficult to apply this method to a large-capacity system since the complexity of the method increases as the system capacity increases.

SUMMARY OF THE INVENTION

The present invention provides an apparatus for and a method of integrating switching and transferring of synchronous digital (synchronous optical network/synchronous digital hierarchy (SONET/SDH)) signals, plesiochronous digital (plesiochronous digital hierarchy (PDH)) signals, and Ethernet signals, thereby providing varied and reliable communications service at a moderate price to users and providing decreased investment costs and maintenance fee to carrier service providers.

The present invention also provides an apparatus and method for a new service using a packet/timeslot bridge besides providing SONET/SDH signal, PDH signal, and Ethernet connection service at a same price and quality to a conventional system by configuring a system accordingly to a switching capacity among packet signals and switching capacity among synchronous digital signals.

According to an aspect of the present invention, there is provided an apparatus for integrating switching and transferring of SONET/SDH, PDH, and Ethernet signals, the apparatus including: a channel configuration management control unit that generates first information which includes switching, bridging and framing information of the input and output signals, controls a flow of the input and output signals, and carries out a SONET/SDH protection switching; an Ethernet signal connection unit that transforms the Ethernet signal into packets with predetermined length with the first information as a basis outputting the packets; a packet switch that switches the packets with the first information as a basis; a PDH/SONET/SDH signals connection unit that maps a digital signal level-n (DSn) signal and optical carrier level-M (OC-M)/synchronous transport module level N (STM-N) signals into a virtual container level 3 or 4 (VC3/4) signal; a timeslot switch that switches a timeslot of VC3/4 units with the first information as a basis, and generates and distributes a system synchronizing signal by receiving a network synchronizing signal; and a packet/timeslot switch that transforms the Ethernet signal extracted from the timeslot switched VC3/4 into packets with a predetermined length with the first information as a basis, and mapping the Ethernet signal generated by reassembling the packets switched to the VC3/4 and carrying out an Ethernet over SONET/SDH (EOS) function.

According to another aspect of the present invention, there is provided a method of integrating switching and transferring of SONET/SDH, PDH, and Ethernet signals, by which output SONET/SDH, PDH, and Ethernet signals are transformed into a signal form appropriate for an external device after carrying out mutual switching for each of the inputted signals, the method including: generating and storing information to process an output signal with characteristics of the input signal as a basis; if the input signal is an Ethernet signal, transforming the Ethernet signal into packets with predetermined length with one of the Ethernet signal and an IP data included in an Ethernet signal as a basis; if the input signal is DSn or OC-M/STM-N signal, transforming DSn or OC-M/STM-N signal into a VC3/4 signal; switching the packets with predetermined length with the information as a basis; timeslot switching the VC3/4 signal with the information as a basis; transforming the switched packets with predetermined length into a form appropriate for timeslot switching by EOS signal processing after reassembling into an Ethernet signal based on the information; transforming the timeslot switched VC3/4 signal into a form appropriate for packet switching by extracting an Ethernet signal by EOS signal processing and segmenting into packets with predetermined length based on the information; and outputting the switched packets and the timeslot switched VC3/4 signal transformed into an appropriate form after doing one of multiplexing, inverse mapping, and reassembling into a signal form appropriate for the external device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
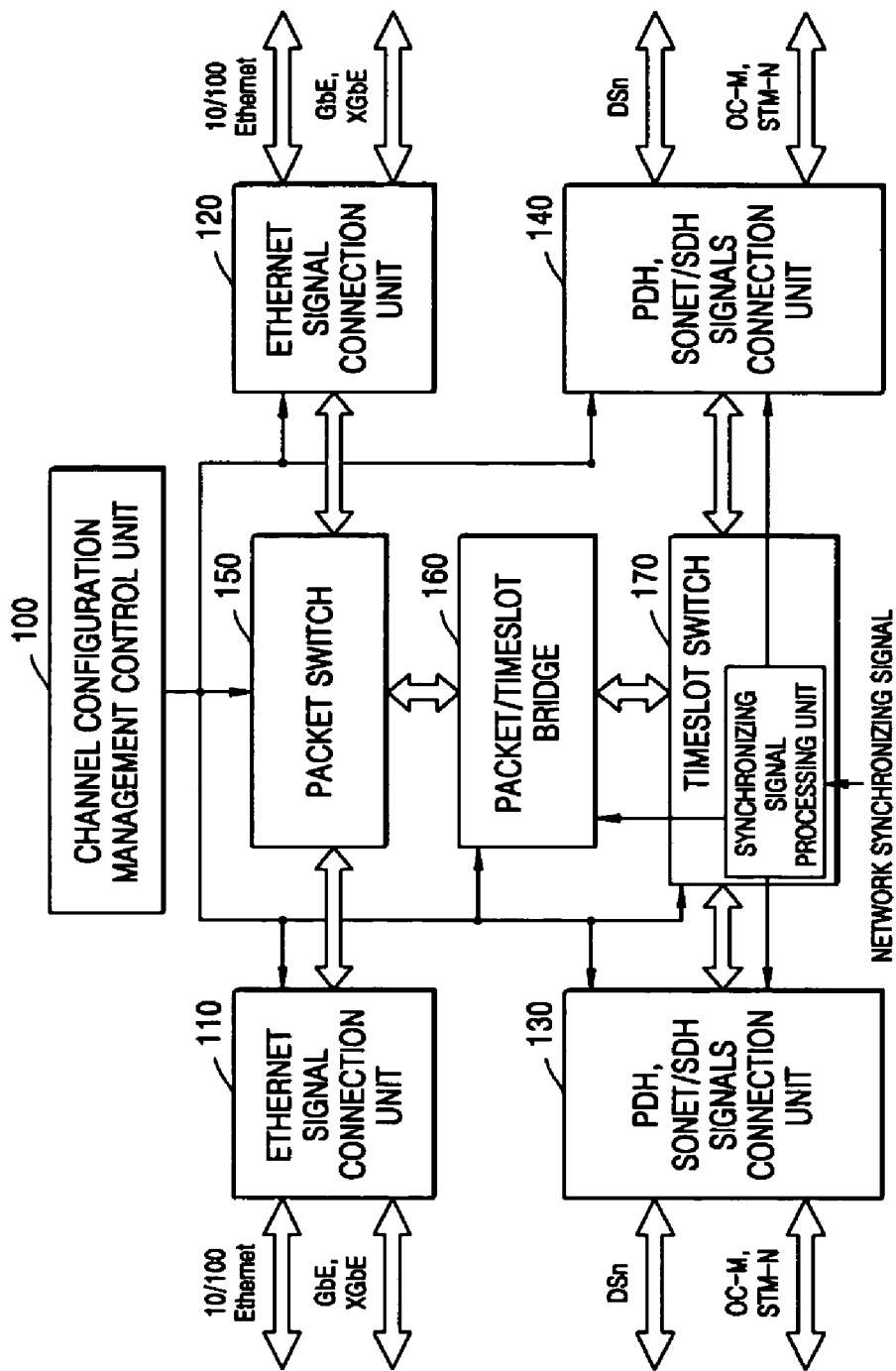
FIG. 1 is a block diagram of an apparatus for integrating switching and transferring of synchronous digital (synchronous optical network/synchronous digital hierarchy (SONET/SDH)) signals, plesiochronous digital (plesiochronous digital hierarchy (PDH)) signals, and Ethernet signals according to the present invention.

The present invention will now be described more fully with reference to the accompanying drawings, in which exemplary embodiments of the invention are shown. In the drawings, parts that are irrelevant to describing the invention are omitted for clarity. Like reference numerals in the drawings denote like elements.

FIG. 1 is a block diagram of an apparatus for integrating switching and transferring of synchronous digital (synchronous optical network/synchronous digital hierarchy (SONET/SDH)) signals, plesiochronous digital (plesiochronous digital hierarchy (PDH)) signals, and Ethernet signals according to the present invention. As illustrated in FIG. 1, an apparatus for integrating switching and transferring of synchronous digital (SONET/SDH) signals, plesiochronous digital (PDH) signals, and Ethernet signals includes a channel configuration management control unit 100, an input and output Ethernet signal connection units 110 and 120, an input and output PDH, SONET/SDH signals connection units 130 and 140, a packet switch 150, a packet/timeslot bridge 160, and a timeslot switch 170.

The channel configuration management control unit 100 generates switching, bridging, and framing information by information such as form of a connection signal, bandwidth, and form of a service; changes a look-up table 208 (see FIG. 2) of the input and output Ethernet signal connection units 110 and 120, a configuration information register 301 (see FIG. 3) of the input and output PDH, SONET/SDH signals connection units 130 and 140, and a look-up table 403 (see FIG. 4) of the packet/timeslot bridge 160 by a SONET/SDH protection switching mechanism; and restructures a connection memory value of the packet switch 150 and the timeslot switch 170. A connection memory is an essential component in a common switch structure, and thus the connection memories of the packet switch 150 and the timeslot switch 170 are not illustrated in the drawing.

Figure 2:
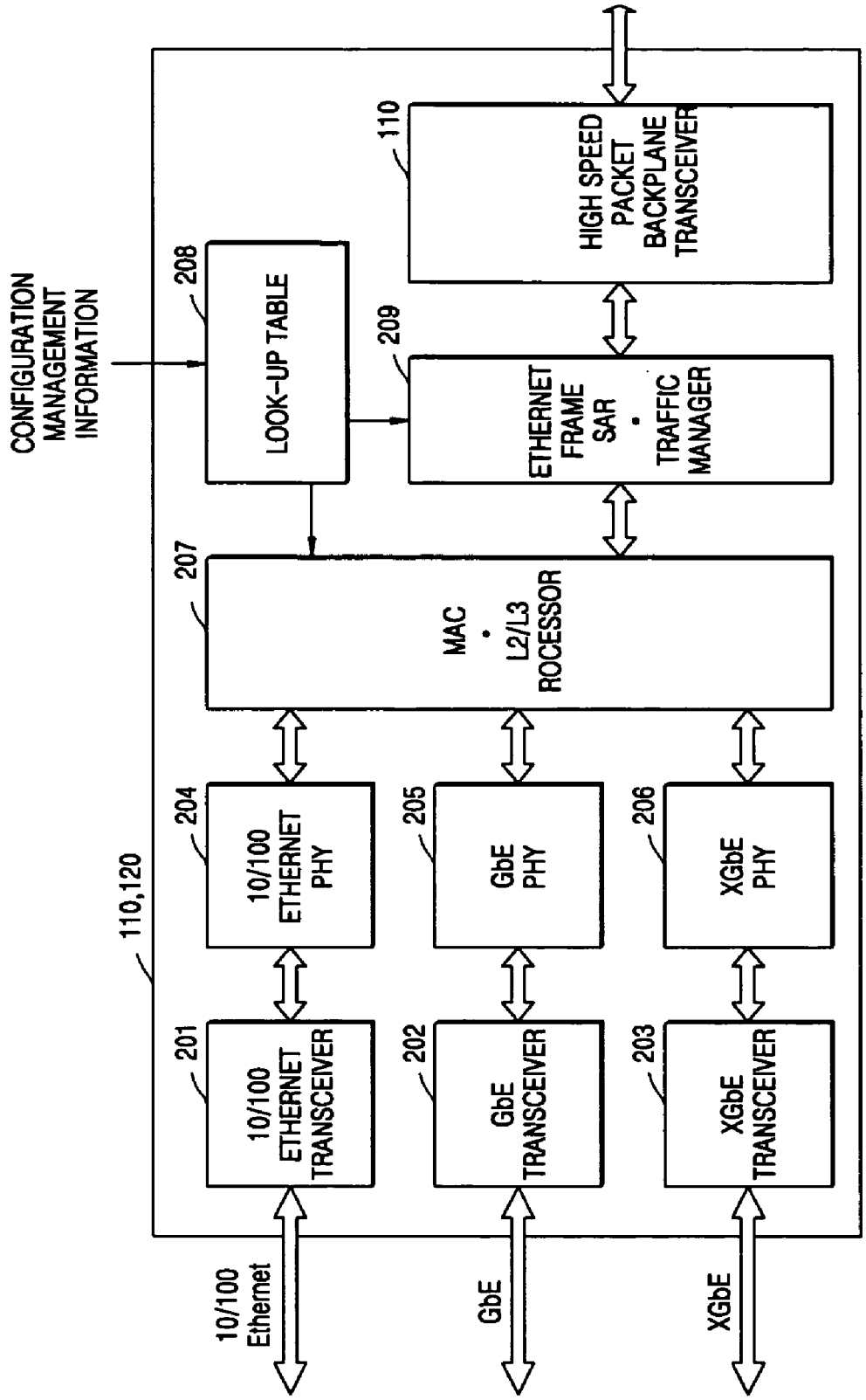
FIG. 2 is a block diagram of Ethernet signal connection units of FIG. 1.
Figure 3:
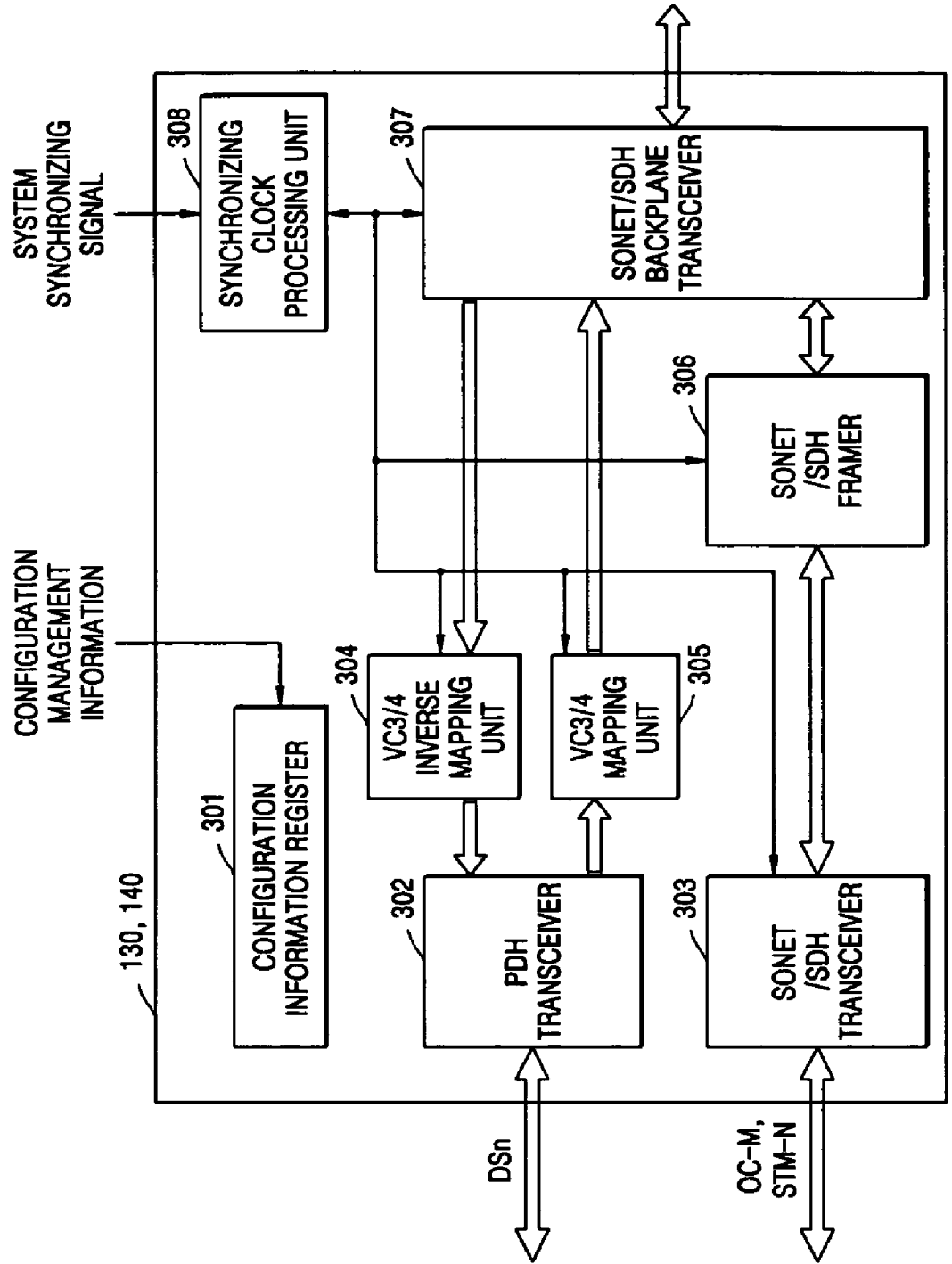
FIG. 3 is a block diagram of SONET/SDH and PDH signals connection units of FIG. 1.
Figure 4:
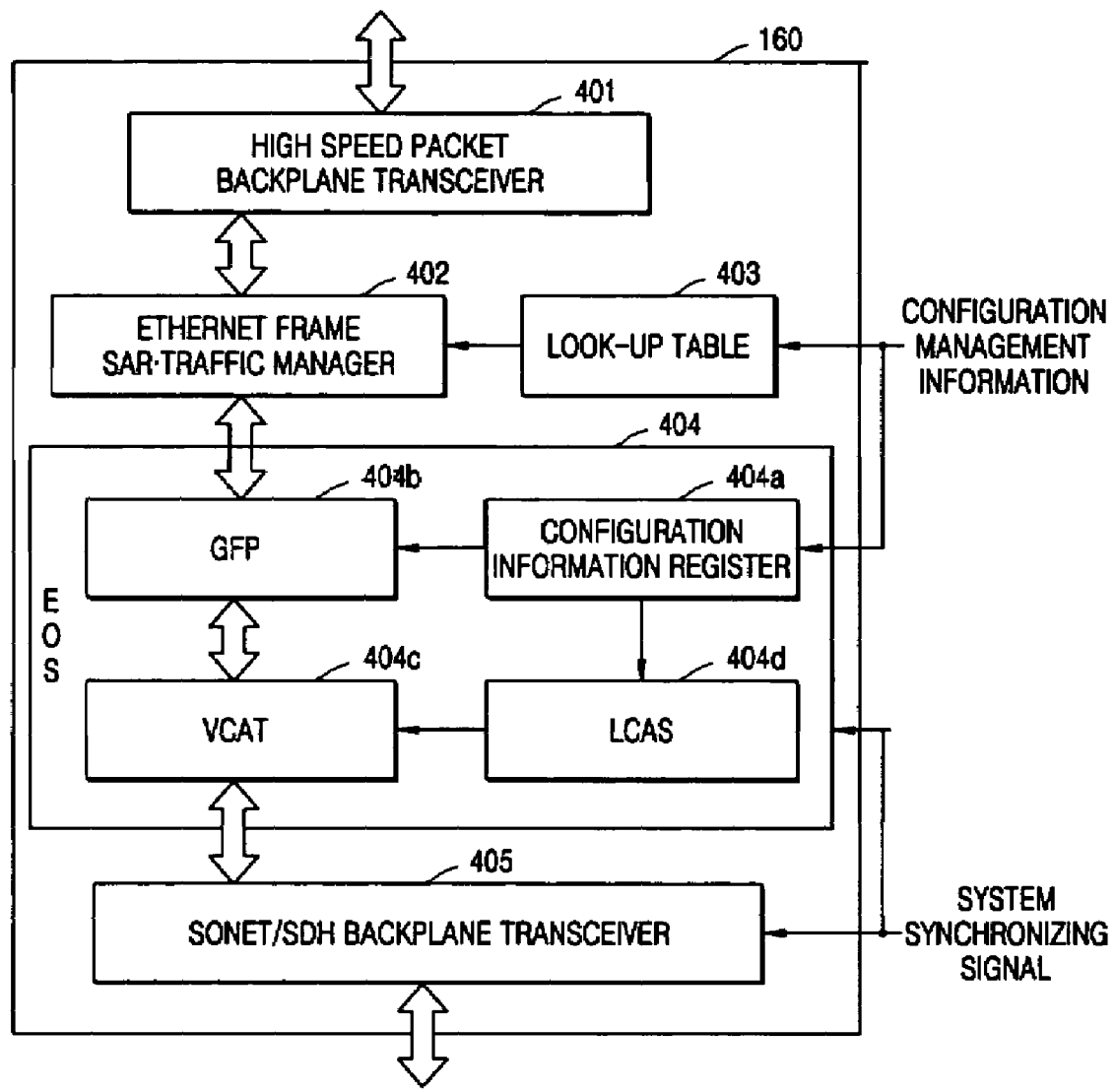
FIG. 4 is a block diagram of a packet/timeslot bridge of FIG. 1.

Referring to FIGS. 2 through 4, configuration of each function block will be described. FIG. 2 is a block diagram of Ethernet signal connection units of FIG. 1. As illustrated if FIG. 2, the input and output Ethernet signal connection units 110 and 120 has a 10/100 Ethernet transceiver 201, a gigabit Ethernet (GbE) transceiver 202 or a 10 gigabit Ethernet (XGbE) transceiver 203 that transceives Ethernet signals of various speed; a 10/100 Ethernet PHY 205, a GbE PHY 205, and a XGbE PHY 206 that carries out encoding/decoding for physical layer (PHY) signals according to the speed of the Ethernet signal received, transmission medium and method; a media access control (MAC) L2/L3 processor 207 that processes overheads like preamble, address, and error correction code of an Ethernet frame, and carries out an L2/L3 processing of data extracted from the frame; a look-up table 208 that stores configuration management and processing information received from the channel configuration management control unit 100; an Ethernet frame segmentation and reassembly (SAR) traffic manager 209 that does the scheduling so that a collision of a switching traffic can be prevented by segmenting or reassembling the Ethernet frame into predetermined length and either adding or deleting switching information; and a high speed backplane transceiver 210 that transceives packets in high speed with the packet switch through a backplane.

FIG. 3 is a block diagram of SONET/SDH and PDH signals connection units of FIG. 1. As shown in FIG. 3, the input and output PDH, SONET/SDH signals connection units 130 and 140 have a configuration information register 301 that stores configuration management information received from the channel configuration management control unit 100; a PDH transceiver 302 that transceives a digital signal level-n (DSn) signal; a SONET/SDH transceiver 303 that transceives optical carrier level-M (OC-M)/synchronous transport module level N (STM-N) signals; a VC3/4 mapping unit 305 that maps the DSn signal received from the PDH transceiver 302 to a virtual container level 3 or 4 (VC3/4); a VC3/4 inverse mapping unit 304 that extracts the DSn signal that will be transmitted through the PDH transceiver 302 from the VC3/4; a SONET/SDH framer 306 that carries out overheads and pointer processing function for OC-M/STM-N signals transceived through the SONET/SDH transceiver 303, and either demultiplexes OC-M/STM-N frames in VC3/4 units or multiplexes VC3/4 in OC-M/STM-N frames and match them; a SONET/SDH backplane transceiver 307 that transmits signals with high speed between input and output PDH, SONET/SDH signals connection units 130 and 140 and the timeslot switch 170 through a backplane; and a synchronizing clock processing unit 308 that generates and distributes clock signals synchronized to the received system synchronizing signals, and transmits a synchronizing clock restored by extracting it from the SONET/SDH transceiver 302.

FIG. 4 is a block diagram of the packet/timeslot bridge 160 of FIG. 1. As shown in FIG. 4, the packet/timeslot bridge 160 includes a high speed backplane transceiver 401 that transceives packets with high speed with the packet switch 150 through the backplane; an Ethernet frame SAR traffic manager 402 that performs the scheduling so that a collision of a switching traffic can be prevented by segmenting or reassembling the Ethernet frame and either adding or deleting switching information of the look-up table 403 set by the channel configuration management control unit 100; an Ethernet over SONET/SDH (EOS) 404 that carries out a generic framing procedure (GFP) 404B which matches the Ethernet frames to the SONET/SDH frames according to a configuration information register 404A set by the channel configuration management control unit 100, and carries out a virtual concatenation (VCAT) 404C and dynamic capacity adjustment scheme (LCAS) 404D for components of the SONET/SDH frames that match the Ethernet signals; and a SONET/SDH backplane transceiver 405 that transmits SONET/SDH signals with high speed through a backplane.

In addition, the EOS 404 of the packet/timeslot bridge 160 and the SONET/SDH backplane transceiver 405 carries out functions after being synchronized by the system synchronizing signal.

The following is a detailed description of the apparatus for integrating switching and transferring of synchronous digital SONET/SDH signals, plesiochronous digital PDH signals, and Ethernet signals with the above-mentioned structure.

First, the channel configuration management control unit 100 changes the look-up table 208 of the input and output Ethernet signal connection units 110 and 120, the configuration information register 301 of the input and output PDH, SONET/SDH signals connection units 130 and 140, and the look-up table 403 of the packet/timeslot bridge 160 by generating switching, bridging, and framing information by information such as form of a connection signal, service bandwidth, and form of a service as a basis, and in addition, restructures the connection memory value of the packet switch 150 and the timeslot switch 170 by carrying out protection-switching function of SONET/SDH.

Figure 5:
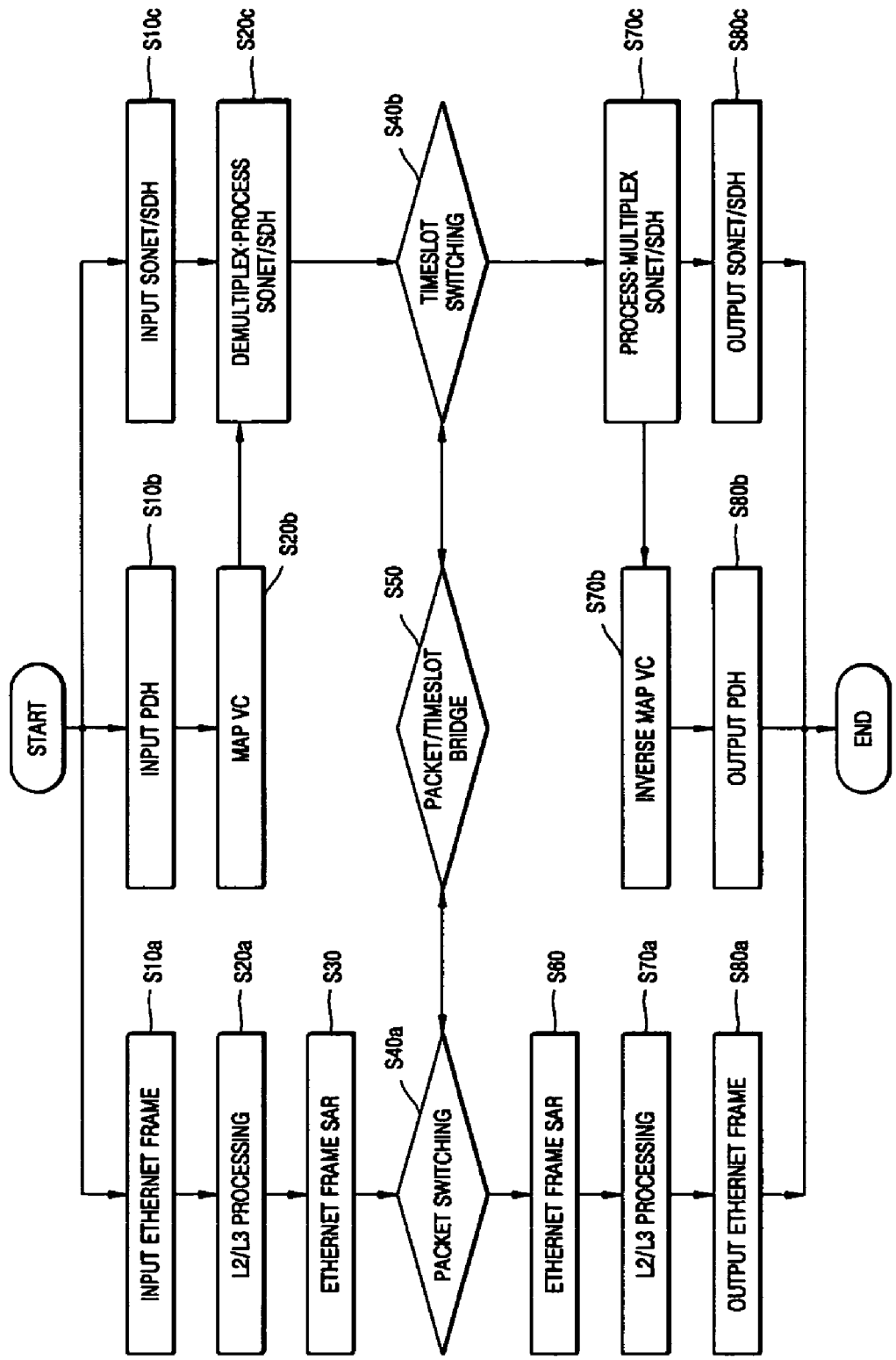
FIG. 5 is a flowchart of a process of integrating switching and transferring of the synchronous digital signals and Ethernet signals according to the present invention.

Referring to FIG. 5, a process of switching and transferring according to a flow of traffic in a channel configuration management perspective will be described. FIG. 5 is a flowchart of a process of integrating switching and transferring of synchronous digital signals and Ethernet signals according to the present invention. The process of switching and transferring can be broadly classified into three parts.

The first switching and transferring process inputs the Ethernet signal (S10A), carries out the L2/L3 processing (S20A), and then segments the Ethernet signal into packets with a predetermined length (S30). The converted packets with predetermined length inputted to the packet switch 150 are switched to the output Ethernet signal connection unit 130 or 140 or to the packet/timeslot bridge 160 (S40A). The packets switched to the output Ethernet signal connection unit 130 or 140 are reassembled as the Ethernet signal (S60), and carries out the L2/L3 processing (S70A), and then is outputted as 10/100 Ethernet, GbE, or XGbE signal (S80A).

The second switching and transferring process reassembles the packets with predetermined length which are inputted to the packet/timeslot bridge 160 through the packet switch 150, the packets are matched to the SONET/SDH timeslot by the EOS signal process, and then outputs the packets to the timeslot switch 170 (S50), or outputs packets segmented into predetermined length after extracting them from an Ethernet signal by the EOS signal process from the VC3/4 signal inputted to the packet/timeslot bridge 160 from the timeslot switch 170 to the packet switch 150 (S50).

The third switching and transferring process timeslot switches (S40B) the VD3/4 that mapped (S20B) the PDH signal (S10B) inputted from the outside of the system and the VC3/4 that demultiplexed and processed (S20C) the SONET/SDH signal (S10C) inputted from the outside of the system to the output PDH, SONET/SDH signals connection unit 130 or 140 or to the packet/timeslot bridge 160. The output PDH, SONET/SDH signals connection unit 130 or 140 either inverse maps the timeslot switched VC3/4 (S70B) and outputs as PDH signal (S80B), or carries out processing and multiplexing of the SONET/SDH (S80C).

The channel configuration management control unit 100 generates switching, bridging, and framing information with information such as form of a connection signal, service bandwidth, and form of a service as a basis for previously mentioned three forms of traffic to set values for the look-up table 208 of the input and output Ethernet signal connection units 110 and 120, the configuration information register 301 of the input and output PDH, SONET/SDH signals connection units 130 and 140, the look-up table 403 of the packet/timeslot bridge 130, and connection memories of the packet switch 150 and the timeslot switch 170. Then, the channel configuration management control unit 100 manages so that each function is carried out with the set value as a basis.

Accordingly, the present invention provides a distinctive service reliability and safety by setting a priority for the three forms of traffics. For example, the present invention provides a highly reliable and safe communications service by carrying out a protection switching operation provided by a SONET/SDH standard for a traffic that is inputted to a PDH, SONET/SDH signals connection unit 140 and is outputted to a PDH, SONET/SDH signals connection unit 130 through a timeslot switch 170. In addition, the present invention provides a lowest service reliability and safety for a traffic that is inputted to an Ethernet signal connection unit 110 and is outputted to an Ethernet signal connection unit 120 through a packet switch 150; and a mid-level service reliability and safety for a traffic that is inputted to an Ethernet signal connection unit 110 and is outputted to a PDH, SONET/SDH signals connection unit 140 through a packet switch 150, a packet/timeslot bridge 160 matched to a SONET/SDH frame, and a timeslot switch 170, respectively.

Additionally, more varied and layered service can be provided by using functions of an MAC L2/L3 processor 207 and an Ethernet frame SAR traffic manager 209 for the traffic that is inputted through the Ethernet signal connection unit 110 and is outputted to the Ethernet signal connection unit 120 through the packet switch 150.

Next, after receiving Ethernet frames inputted to a system, the input and output Ethernet signal connection units 110 and 120 segments the received frame data into packets in forms the packet switch 150 can recognize and reassembles the packets with a predetermined length received from the packet switch 150 into the Ethernet frames (SAR), and then outputs the Ethernet frames.

Here, the input and output Ethernet signal connection units 110 and 120 analyses configuration management information of the look-up table 208, recognizes output port information and priority information corresponding to the packet or Ethernet frame packet switch 150, and then either adds or deletes switching information the packet switch 150 can recognize.

The packet switch 150 switches the packets to corresponding output ports by the switching information included in the packet with predetermined length received from the input and output Ethernet signal connection units 110 and 120. The packet switch 150 provides a non-blocking switching path to the input and output Ethernet signal connection units 110 and 120 and the packet/timeslot bridge 160. Here, the packet switch 150 carries out the switching function by using queuing for each destination output port, scheduling, crossbar or shared buffering which the general packet switches of predetermined length carries out.

Next, the input and output PDH, SONET/SDH signals connection unit 130 and 140 maps a DSn (n=0, 1, 2, 3) signal into VC3/4, and carries out overhead and pointer process functions to OC-M (M=3, 12, 48, 192, 768)/STM-N (N=M/3)

signal. Then, demultiplexes in VC3/4 units and outputs to the timeslot switch 170. Also, the input and output PDH, SONET/SDH signals connection unit 130 and 140 outputs the DSn signal that inverse mapped the timeslot switched VC3/4 and the OC-M/STM-N signals that multiplexed the VC3/4 signals and framed SONET/SDH to the outside of the system.

Here, a configuration related to multiplexing/demultiplexing and framing between the VC3/4 signal and the OC-M/STM-N signal and mapping and inverse mapping information between the DSn signal and the VC3/4 signal, and control information are already stored at the configuration information register 301 by a channel configuration control unit 100.

Here, the timeslot switch 170 carries out a timeslot switching in VC3/4 units by connection memory information set by the channel configuration management control unit 100. Also, the timeslot switch 170 can carry out the timeslot switching function as a forced switching, passive switching, or automatic switching systems by a SONET/SDH protection switching mechanism the channel configuration management control unit 100 carries out.

In addition, the timeslot switch 170 carries out the timeslot switching by synchronizing to a network synchronizing signal received from an SONET/SDH synchronizing source outside the system, and generates a system synchronizing signal from the received network synchronizing signal and distributes to the input and output PDH, SONET/SDH signal connection units 130 and 140 and the packet/timeslot bridge 160, thereby synchronizing the system operation.

Lastly, the packet/timeslot bridge 160 reassembles the packets of predetermined length inputted from the packet switch 150 and generates the Ethernet frames. Then, the packet/timeslot bridge 160 frames the generated Ethernet frames with GFP into VC3/4 using information set in a configuration information register 404A, provides VCAT virtual concatenation composed of VC3/4s, and carries out dynamic bandwidth control function to VC3/4 that makes up a virtual concatenation group (VCG). Also, the packet/timeslot bridge 160 extracts the Ethernet frame from the VC3/4 signal inputted from the timeslot switch 170, transforms the Ethernet frame into a packet of predetermined length with reference to the look-up table 403, and then outputs the packet to the packet switch 150.

Here, when inputting and outputting the VC3/4 signal, the packet/timeslot bridge 160 is synchronized to the system synchronizing signal received from the timeslot switch 170

A method of integrating switching and transferring of SONET/SDH, PDH, and Ethernet signals according to the present invention can also be embodied as a computer code on a recording medium. The recording medium includes all types of recording devices on which data a computer system can read are stored. Examples of the recording medium includes read-only memory (ROM), random access memory (RAM), compact disk read-only memory (CD-ROM), magnetic tape, hard disk, floppy disk, flash memory, optical data storage device, and carrier waves (for example, transmission through the Internet). In addition, the method can be stored as computer codes and be executed in a distributed manner on a computer system connected to a computer communication network.

As described above, an apparatus for integrating switching and transferring of synchronous digital (SONET/SDH) signals, plesiochronous digital (PDH) signals, and Ethernet signals according to the present invention can provide various bandwidths and quality performance in a single platform, and a integration of packet exchange service, synchronous timeslot exchange service, and packet/timeslot bridging service.

In addition, it can enlarge and configure packet switching capacity, timeslot switching capacity, and packet/timeslot bridging capacity, and can provide a distinctive service through a packet/timeslot bridge compared to a service provided by a separate Ethernet device or a SONET/SDH network device.

Through the above-mentioned features, varied and reliable communication service at a moderate price is provided to service users, and decreased investment and maintenance fee is provided to service providers.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for integrating switching and transferring of input synchronous optical network/synchronous digital hierarchy (SONET/SDH) signals, plesiochronous digital hierarchy (PDH) signals, and Ethernet signals, the apparatus comprising:
    a channel configuration management control unit that generates first information which includes switching, bridging and framing information of the input signals;
    an Ethernet signal connection unit that transforms the Ethernet signal into packets with predetermined length and using the first information for outputting the packets;
    a packet switch that switches the packets using the first information;
    a PDH/SONET/SDH signals connection unit that maps a digital signal level-n (DSn) signal and an optical carrier level-M (OC-M)/synchronous transport module level N(STM-N) signal into a virtual container level 3 or 4 (VC3/4) signal;
    a timeslot switch that switches a timeslot of VC3/4 units using the first information, and generates and distributes a system synchronizing signal by receiving and using a network synchronizing signal; and
    a packet/timeslot switch that transforms an Ethernet signal extracted from the timeslot switched VC3/4 into packets with a predetermined length using the first information, and maps an Ethernet signal generated by reassembling the packets switched to the VC3/4 and carrying out an Ethernet over SONET/SDH (EOS) function.

2. The apparatus of claim 1, wherein when the Ethernet signal connection unit processes the inputted Ethernet signal, the Ethernet signal connection unit comprises:
    a look-up table that receives configuration management and processing information from the channel configuration management control unit and stores the information;
    an interface unit that receives an Ethernet signal and carries out encoding and decoding at a physical layer;
    an media access control (MAC) L2/L3 processor that designates a priority to the Ethernet signal or Internet Protocol (IP) data included in an Ethernet signal, and classifies a switching path; and
    a segmentation and reassembly (SAR) traffic manager that transforms the classified Ethernet signal into packets with predetermined length and outputs the packets to the packet switch, and manages a flow of the packets.

3. The apparatus of claim 1, wherein when the Ethernet signal connection unit outputs an Ethernet signal, the Ethernet signal connection unit comprises:
- a look-up table that receives configuration management and processing information from the channel configuration management control unit and stores the information;
- a SAR traffic manager that manages a flow of the packets with predetermined length inputted to the packet switch, and generates an Ethernet signal by reassembling the packets with predetermined length; and
- an MAC L2/L3 processor that designates priority to the Ethernet signal or Internet Protocol (IP) data included in an Ethernet signal, and classifies a switching path; and
- an interface unit that carries out encoding and decoding to the Ethernet signal at a physical layer and outputs the Ethernet signal.

4. The apparatus of claim 2 or claim 3, wherein the Ethernet interface unit transceives 10/100 Ethernet signal, gigabit Ethernet signal, and 10 gigabit Ethernet signal, and carries out encoding and decoding to the each Ethernet signals at a physical layer.

5. The apparatus of claim 1, wherein when the PDH/SONET/SDH signals connection unit receives PDH and SONET/SDH signals, the PDH/SONET/SDH signals connection unit comprises:
- a configuration information register that stores information that includes a configuration management information received from the channel configuration management control unit;
- a SONET/SDH framer that processes an overhead and pointer of an OC-M/STM-N signal inputted with the information stored in the configuration information register as a basis, and multiplexes into a VC3/4;
- a VC3/4 mapping unit that matches an DSn signal inputted with the information stored in the configuration information register as a basis to a VC3/4; and
- a SONET/SDH backplane transceiver that transmits a VC3/4 signal the VC3/4 mapping unit and the SONET/SDH framer outputs to the timeslot switch.

6. The apparatus of claim 1, wherein when the PDH/SONET/SDH signals connection unit outputs PDH and SONET/SDH signals, the PDH/SONET/SDH signals connection unit comprises:
- a configuration information register that stores information that includes a configuration management information received from the channel configuration management control unit;
- a SONET/SDH backplane transceiver that receives a VC3/4 signal from the timeslot switch and outputs to the VC3/4 inverse mapping unit and the SONET/SDH framer with the information stored in the configuration information register as a basis;
- a SONET/SDH framer that processes an overhead and pointer after multiplexing VC3/4 signals received from the SONET/SDH backplane transceiver with the information stored in the configuration information register as a basis, and frames into and outputs OC-M/STM-N signals; and
- a VC3/4 inverse mapping unit that inverse maps the VC3/4 signal into a DSn signal with the information stored in the configuration information register as a basis.

7. The apparatus of claim 1, wherein the packet/timeslot bridge comprises:
- a packet backplane transceiver that transceives packets with the packet switch;
- a look-up table that receives packet-related configuration information from the channel configuration management control unit and stores the information;
- a configuration information register that receives timeslot-related configuration information from the channel configuration management control unit and stores the information;
- an Ethernet frame SAR traffic manager that generates Ethernet signals by reassembling packets inputted from the packet switch according to the packet-related configuration information stored at the look-up table, or outputs the received Ethernet signals after they are segmented and transformed into packets with predetermined length to the packet switch, and manages a flow of input and output packet traffic;
- an EOS signal processing unit that forms a virtual concatenation group after mapping Ethernet signals to VC3/4 according to the timeslot-related configuration information stored at the configuration information register, and carries out a dynamic bandwidth control function to the virtual concatenation group; and
- a SONET/SDH backplane transceiver that transceives synchronous digital signals with the time slot switch.

8. A method of integrating switching and transferring of inputted SONET/SDH, PDH, and Ethernet signals, to output SONET/SDH, PDH, and Ethernet signals which are transformed into a signal form appropriate for an external device after carrying out mutual switching for each of the inputted signals, the method comprising:
- generating and storing information to process an output signal with characteristics of the input signal as a basis;
- if the input signal is an Ethernet signal, transforming the input Ethernet signal into packets with predetermined length using one of the input Ethernet signal and an IP data included in the input Ethernet signal, and switching the packets with predetermined length using the generated and stored information;
- if the input signal is DSn or OC-M/STM-N signal, transforming DSn or OC-M/STM-N signal into a VC3/4 signal;
- timeslot switching the VC3/4 signal using the generated and stored information;
- transforming the switched packets with predetermined length into a form appropriate for timeslot switching by EOS signal processing after reassembling into an Ethernet signal based on the generated and stored information;
- if the input signal is DSn or OC-M/STM-N signal, transforming the DSn or OC-M/STM-N signal into a VC3/4 signal; and
- transforming the timeslot switched VC3/4 signal into a form appropriate for packet switching by extracting an Ethernet signal by EOS signal processing and segmenting into packets with predetermined length using the generated and stored information; and
- outputting the switched packets and the timeslot switched VC3/4 signal transformed into an appropriate form after doing one of multiplexing, inverse mapping, and reassembling of the transformed switched packets into a signal form appropriate for the external device.

9. The method of claim 8, wherein the information includes packet switching, bridging, timeslot switching, priority, and protection switching information.

* * * * *